(12) United States Patent
Inoko et al.

(10) Patent No.: US 7,686,459 B2
(45) Date of Patent: Mar. 30, 2010

(54) LENS ARRAY OPTICAL SYSTEM, PROJECTION OPTICAL UNIT, AND IMAGE PROJECTION APPARATUS

(75) Inventors: Kazuhiro Inoko, Utsunomiya (JP); Hiroyuki Kodama, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 950 days.

(21) Appl. No.: 11/474,003

(22) Filed: Jun. 23, 2006

(65) Prior Publication Data

US 2006/0290903 A1 Dec. 28, 2006

(30) Foreign Application Priority Data

Jun. 23, 2005 (JP) .............................. 2005-182786

(51) Int. Cl.
*G03B 21/20* (2006.01)

(52) U.S. Cl. ..................................... 353/102

(58) Field of Classification Search ................. 359/207, 359/310, 619–640, 646, 711; 353/20, 38, 353/102; 362/335
See application file for complete search history.

(56) References Cited

U.S. PATENT DOCUMENTS

| 5,418,583 | A  | * | 5/1995  | Masumoto ................. 353/38   |
| 6,062,695 | A  | * | 5/2000  | Kakuda et al. .............. 353/38   |
| 6,273,569 | B1 | * | 8/2001  | Iechika et al. ............... 353/38   |
| 6,373,629 | B1 | * | 4/2002  | Yamagishi et al. .......... 359/487  |
| 6,416,182 | B1 | * | 7/2002  | Kakuda et al. .............. 353/20   |
| 6,431,727 | B1 | * | 8/2002  | Sugawara et al. ........... 362/244  |
| 6,513,953 | B1 | * | 2/2003  | Itoh ............................ 362/331  |
| 6,632,004 | B2 | * | 10/2003 | Sugawara et al. ........... 362/281  |
| 6,729,730 | B2 | * | 5/2004  | Ito .............................. 353/20   |
| 7,119,957 | B2 | * | 10/2006 | Itoh et al. .................... 359/495  |
| 7,206,133 | B2 | * | 4/2007  | Cassarly et al. ............. 359/630  |
| 7,213,920 | B2 | * | 5/2007  | Matsui et al. ................ 353/20   |
| 2002/0018184 | A1 | * | 2/2002 | Ito .............................. 353/30   |
| 2003/0007359 | A1 | * | 1/2003 | Sugawara et al. ........... 362/326  |
| 2005/0128921 | A1 | * | 6/2005 | Inoko ....................... 369/112.09 |
| 2006/0215247 | A1 | * | 9/2006 | Koide ......................... 359/216  |
| 2007/0085971 | A1 | * | 4/2007 | Okuyama et al. ............ 353/20   |
| 2007/0195273 | A1 | * | 8/2007 | Nishida et al. ............... 353/20   |
| 2007/0291344 | A1 | * | 12/2007| Yamauchi et al. ........... 359/205  |

FOREIGN PATENT DOCUMENTS

JP 11-295658 10/1999
JP 2000-206463 7/2000

* cited by examiner

*Primary Examiner*—Georgia Y Epps
*Assistant Examiner*—Danell L Owens
(74) *Attorney, Agent, or Firm*—Rossi, Kimms & McDowell LLP

(57) ABSTRACT

A lens array optical system includes a first lens array that includes plural first lens cells arranged in first and second directions, the first lens array being configured to split a light flux to plural split light fluxes and to condense each split flux; and a second lens array that includes plural second lens cells arranged in the first and second directions, each second lens cell being configured to receive the split lights from each first lens cell, wherein a ratio between a width of an arrangement area of the first lens cells and a width of an arrangement area of the second lens cells in the first direction is different from a ratio between a width of an arrangement area of the first lens cells and a width of an arrangement area of the second lens cells in the second direction, and wherein at least one of the first and second lens arrays has a toric surface.

6 Claims, 11 Drawing Sheets

LIGHT COMPRESSION RATIO = W2/W1

PRIOR ART

LENS ARRAY OPTICAL SYSTEM, PROJECTION OPTICAL UNIT, AND IMAGE PROJECTION APPARATUS

BACKGROUND OF THE INVENTION

The present invention is an optical system having a lens array that includes plural, two-dimensionally arranged lens cells, and is used, for example, for an optical system used to illuminate the image modulation element or image forming element using a light from a light source.

A conventional projector or image projecting apparatus modulates a light from a light source by using an image modulation element, such as a liquid crystal panel, in accordance with an image signal, and projects the modulated light onto a screen via a projection lens. It is important for this projector to maintain uniform brightness and color and a high contrast on an image projected on a screen.

FIGS. 11A and 11B show an illustrative illumination optical system that illuminates an image modulation element in the projector. FIGS. 11A and 11B show an YZ section and an XZ section in the conventional illumination optical system. The Z-axis is an axis that extends in a central optical axis direction of the illumination optical system.

In these figures, the light exited from a light source 501 is collimated by a paraboloid reflector 502, and then split into plural lights by a first fly-eye lens 503. Each light is condensed near a second fly-eye lens 504, forming a (secondary) light source image. Plural lens cells in the fly-eye lenses 503 and 504 have a rectangular lens plane similar to a liquid crystal panel as an illuminated plane.

The polarization conversion element 505 aligns polarization directions of the split lights exited from the second fly-eye lens 504. The lights are then condensed by the condenser lens 506, and superimposed on the liquid crystal panel 508 through a color separating/synthesizing system (not shown) that provides a color separation and a color synthesis.

In general, an attempt to improve the light use efficiency in this illumination optical system is likely to increase a light angular distribution. Therefore, use of an optical element that has a characteristic or incident angle dependency sensitive to an angular distribution of the incident light in the illumination optical system would pose problems of the uneven brightness and color, the lowed contrast, and the deteriorated image quality. Illustrative optical element having the incident angle dependency are a mirror and a prism having a dichroic film and a polarization splitting film that are arranged oblique to the optical axis, and these optical elements are used for a color separation and a color synthesis.

As a solution for the problem of the image quality deterioration, Japanese Patent Application, Publication No. 11-295658 proposes a technology that decenters each lens cell in one of orthogonal lens cell arrangement directions, and narrows a light width incident upon the second lens array, thereby reducing an angular distribution in a direction sensitive to the light angular distribution.

Japanese Patent Application, Publication No. 2000-206463 proposes a technology that uses an approximately circular first lens array, and condenses the light to an approximately rectangular second lens array, thereby receiving the light from the light source as much as possible.

However, a lens cell in each lens array proposed in Japanese Patent Application, Publication No. 11-295658 is a spherical lens, and cannot provide decentering greater than a radius of curvature. In addition, when each lens cell 601a in a first lens array 601 is given large decentering as shown in FIG. 12, a light source image formed near a second lens array 602 destroys due to the (spherical) aberration that occurs in the lens cell 601a, lowering the illumination efficiency. Moreover, it is difficult to mold a significantly decentering lens cell, and the practicability is low.

A much narrower arrangement area width of the lens cell in the second lens array than that of the first lens array is needed to provide a practicable effect of image quality maintenance, but prior art is silent about such solutions.

BRIEF SUMMARY OF THE INVENTION

The present invention is directed to an optical system that provides high light use efficiency by sufficiently reducing the light angular distribution, while maintaining easy molding of a lens array.

A lens array optical system according to one aspect of the present invention includes a first lens array that includes plural first lens cells arranged in first and second directions, each first lens cell being configured to split a light and to condense a split light, and a second lens array that includes plural second lens cells arranged in the first and second directions, each second lens cell being configured to receive the split lights from each first lens cell, wherein a ratio between a width of an arrangement area of the first lens cells and a width of an arrangement area of the second lens cells in the first direction is different from a ratio between a width of an arrangement area of the first lens cells and a width of an arrangement area of the second lens cells in the second direction, and wherein at least one of the first and second lens arrays has a toric surface.

A projection optical unit according to another aspect of the present invention includes an illumination optical system for illuminating an image forming element using a light flux from a light source, the illumination optical system including the above lens array optical system, and a projection optical system for projecting the light from the image forming element.

An image projection apparatus according to still another aspect of the present invention includes an image forming element, an illumination optical system for illuminating the image forming element using a light from a light source, the illumination optical system including the above lens array optical system; and a projection optical system for projecting the light form the image forming element.

An image projection apparatus according to another aspect of the present invention includes an image forming element, an illumination optical system for illuminating the image forming element using a light flux from a light source, and a projection optical system for projecting the light form the image forming element, wherein the illumination optical system includes a lens array optical system that includes a first lens array that includes plural first lens cells arranged in first and second directions, the first lens array being configured to split a light flux to plural split light fluxes and to condense each split flux, and a second lens array that includes plural second lens cells arranged in the first and second directions, each second lens cell being configured to receive the split light from each first lens cell, wherein a value made by dividing a width of an arrangement area of the second lens cells by a width of an arrangement area of the first lens cells in the first direction is smaller than a value made by dividing a width of an arrangement area of the second lens cells by a width of an arrangement area of the first lens cells in the second direction, and wherein at least one of the first and second lens arrays include a lens cell that is aspheric on a first section parallel to a direction of a central optical axis of the illumination optical system and the first direction.

An image projection apparatus according to another aspect of the present invention includes an image forming element, an illumination optical system for illuminating the image forming element using a light from a light source; and a projection optical system for projecting the light form the image forming element, wherein the illumination optical system includes a lens array optical system that includes a first lens array that includes plural first lens cells arranged in first and second directions, the first lens array being configured to split a light flux to plural split light fluxes and to condense each split flux, and a second lens array that includes plural second lens cells arranged in the first and second directions, each second lens cell being configured to receive the split light from each first lens cell, wherein a ratio between a width of an arrangement area of the first lens cells and a width of an arrangement area of the second lens cells in the first direction is different from a ratio between a width of an arrangement area of the first lens cells and a width of an arrangement area of the second lens cells in the second direction, and wherein the lens array optical system further includes a lens surface that is different from the first and second lens cells in an optical path from the first lens cell to the second lens cell.

An image projection apparatus according to another aspect of the present invention includes an image forming element, an illumination optical system for illuminating the image forming element using a light from a light source, and a projection optical system for projecting the light form the image forming element, wherein the illumination optical system includes a lens array optical system that includes a first lens array that includes plural first lens cells arranged in first and second directions, the first lens array being configured to split a light flux to plural split light fluxes and to condense each split flux, and a second lens array that includes plural second lens cells arranged in the first and second directions, each second lens cell being configured to receive the split light from each first lens cell, wherein a ratio between a width of an arrangement area of the first lens cells and a width of an arrangement area of the second lens cells in the first direction is different from a ratio between a width of an arrangement area of the first lens cells and a width of an arrangement area of the second lens cells in the second direction, and wherein the lens array further includes a afocal optical system between a plane on which the first lens cells in the first lens array are formed, and a plane on which the second lens cells in the second lens array are formed.

Other objects and further features of the present invention will become readily apparent from the following description of the preferred embodiments with reference to the accompanying drawings.

DETAILED DESCRIPTION OF THE PREFERRED EMBODIMENTS

Referring now to the accompanying drawings, a description will be given of the preferred embodiment of the present invention.

First Embodiment

Figure 1A:
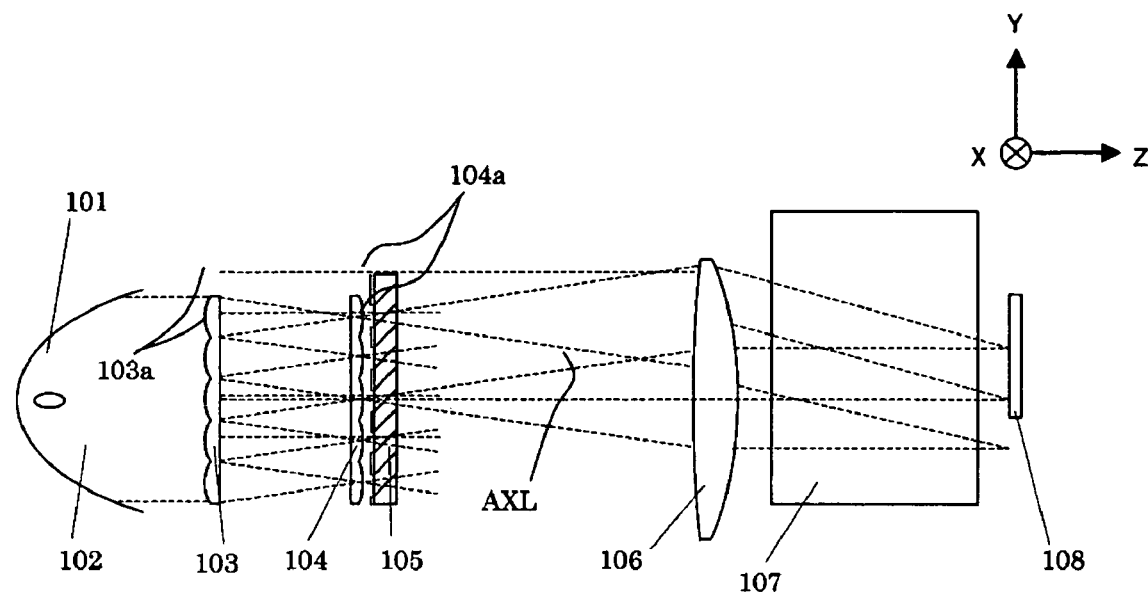
FIGS. 1A and 1B are sectional views of a structure of an illumination optical system according to a first embodiment of the present invention.
Figure 1B:
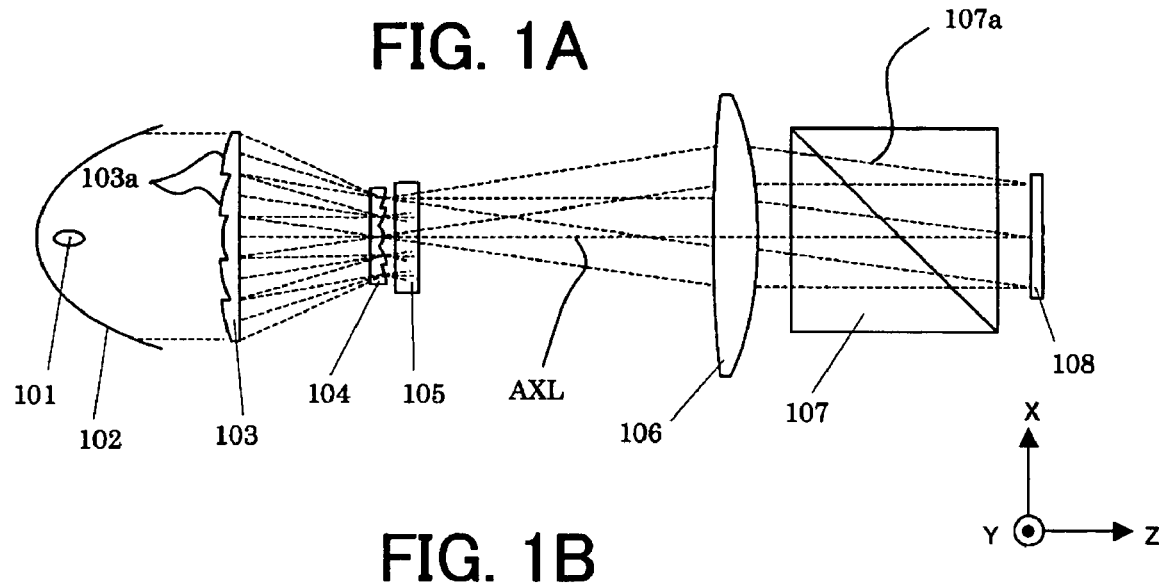

FIGS. 1A and 1B show a structure of an illumination optical system according to a first embodiment of the present invention. Here, an illumination optical system in a projector uses a reflection-type liquid crystal panel ((reflective liquid crystal panel) as an image modulation element or image forming element. The present invention is applicable to an illumination optical system of the projector using the transmission type liquid crystal panel.

FIGS. 1A and 1B indicate a section having a wide light angular distribution (YZ section: second section) and a narrow light angular distribution (XZ section: first section), where Z-axis is an axis that extends along a central optical axis AXL of the illumination optical system (which is an optical axis that passes the center of the illumination optical system). FIGS. 1A and 1B show only basic components in the illumination optical system for description convenience. Indeed, the illumination optical system further includes other optical elements, such as an optical-path deflecting mirror, a heat ray filter, and a polarization plate. The number of liquid crystal panels may be one or plural.

In FIGS. 1A and 1B, a paraboloid reflector 102 collimates lights omni-directionally exited from a light source (discharge tube) 101. The collimated light is split into plural lights by a first lens array 103, and each split light is condensed near the second lens array 104 or a polarization conversion element 105, forming plural (secondary) light source images. The polarization conversion element 105 is an optical element that aligns the incident polarization directions of the non-polarized lights with one predetermined direction. The polarization conversion element 105 includes plural polarization splitting films, plural reflecting planes, and plural ½ wave plates, which incline by 45° relative to the central optical axis direction on the YZ section. A detailed description of the operation of the polarization conversion element 105 will be given in the following embodiment.

The first lens array 103 includes plural first lens cells 103a at its incident side in an X direction (first direction) and a Y direction (second direction). Preferably, the first lens cells are arranged in orthogonal directions (i.e., meaning that first and second directions or X and Y directions are orthogonal). However, the angle between these directions may be between 70° and 110°, more preferably between 80° and 100°, and most preferably between 85° and 95°.

The second lens array 104 includes plural second lens cells 104a at its exit side in the X and Y directions, each corresponding to the first lens cell 103a. Similar to the first lens array, the second lens array is preferably arranged in orthogonal directions. However, the angle between the directions may be between 70° and 110°, more preferably between 80° and 100°, and most preferably between 85° and 95°.

The first lens cell 103a decenters toward the central optical axis AXL from the X direction except for the lens cells on the central optical axis AXL. The "decenter of decentering," as used herein, means a shift of the lens surface apex of the lens cell from the center of the area in which the lens cell is formed. A decentering amount increases as a distance between the first lens cell 103 and the central optical axis AXL increases. Thereby, a width of the light that passes the first lens array 103 is entirely compressed towards the central optical axis AXL on the XZ section.

The optical axis direction of the lens cell may (completely or approximately) accord with the center of the area in which the lens cell near the central optical axis AXL (which is a lens cell that does not have to be decentered significantly or a lens cell around the central optical axis) is formed. However, decentering is necessary for the lens cell apart from the central optical axis (which does not contact the central optical axis or the lens cell apart from the central optical axis by a distance greater than a width of the lens cell).

On the other hand, the second lens cell 104a decenters in a direction separating from the central optical axis AXL in the X direction except for the lens cells on the central optical axis AXL. The decentering amount of the second lens cell 104a increases as the distance between the lens cell and the central optical axis AXL becomes larger. Thereby, the traveling direction of the split light inclined in the compression direction by the first lens array returns to a direction along the central optical axis AXL.

Figure 6:
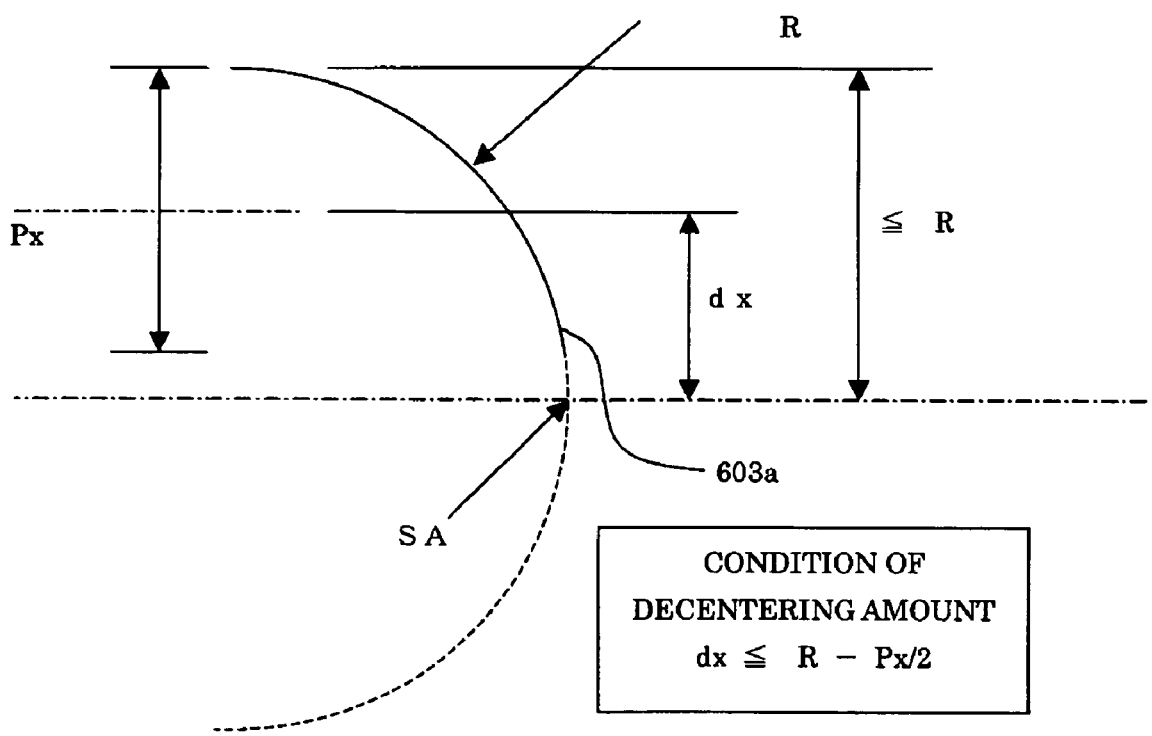
FIG. 6 is a view for explaining a condition of the decentering amount.

In decentering lens cells in the lens array that includes spherical lens cells while maintaining the shape, the following condition shown in FIG. 6 should be met:

$$dx \leq R - Px/2 \quad (1)$$

where dx is a decentering amount of the lens cell relative to the spherical center axis, R is a radius of curvature of the spherical surface, and Px is a lens cell forming area in the decentering direction. If this condition is not met, the lens surface shape of the lens cell 603a exceeds the semi-sphere.

Therefore, large decentering with an increased radius of curvature R of the lens cell 603a needs to reduce the number of divisions of the lens cells 603a, and to extend the focal distance of the lens cell 603a.

However, the reduced number of divisions of the lens cells would degrade the uniformity of a brightness distribution of the illumination optical system, which is an important purpose, increases an interval between the first and second lens arrays, and causes the entire optical system to be larger. In addition, the radius of curvature should satisfy the condition shown in FIG. 6 with sufficient latitude. Without the latitude, the lens becomes a nearly semispherical lens and its manufacture becomes difficult with respect to a shape. In addition, without the latitude, the aberration increases, the light source image deforms, and the light use efficiency lowers remarkably.

Figure 4:
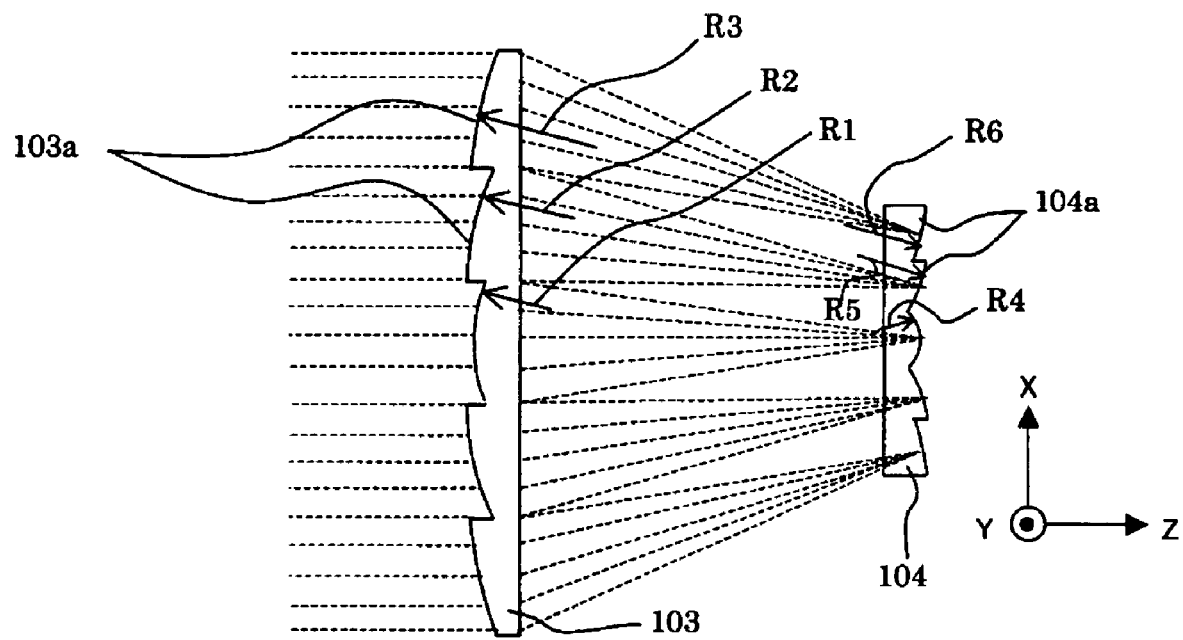
FIG. 4 is an enlarged view of the first and second lens arrays.

This embodiment solves this problem by providing each of the lens cells 103a and 104a of the first and second lens arrays 103 and 104 with a so-called toric lens or surface having a different radius of curvature between the XZ section and the YZ section. More specifically, while plural first lens cells 103a have the same radius of curvature on the YZ section, but a radius of curvature on the XZ section is greater than that on the YZ section. In addition, the first lens cell 103a has a larger radius of curvature on the YZ section as the distance increases from the central optical axis AXL. FIG. 4 schematically shows that the first cells 103a have gradually larger radius of curvatures R1, R2, R3 on the XZ section in this order as the distances increase from the center of optical axis AXL.

The plural second lens cell 104a have the same radius of curvature on the YZ section, but a larger radius of curvature on the XZ section than that on the YZ section. In addition, a radius of curvature of the second lens cell 104a increases on the YZ section as the distance from the central optical axis AXL increases. FIG. 4 schematically shows that the radius of curvatures R4, R5, R6 of the second cells 104a gradually increase in this order on the XZ section as the distance increases from the center of optical axis AXL.

Thereby, the first and second lens arrays 103 and 104 satisfy the condition shown in FIG. 6 on the XZ section with sufficient latitude, and maintain large decentering and shaping suitable for molding. In addition, a narrowed light source image can be formed with much less aberration than that of the spherical lens array.

The lens cells on and near the central optical axis AXL have a few decentering amounts or 0, and thus may include a spherical lens.

Figure 2:
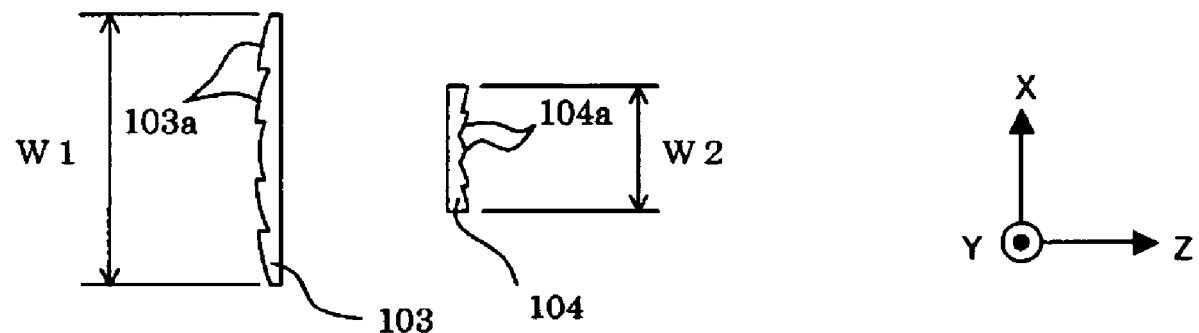
FIG. 2 is a view for explaining a light compression ratio in the first embodiment.
Figure 3A:
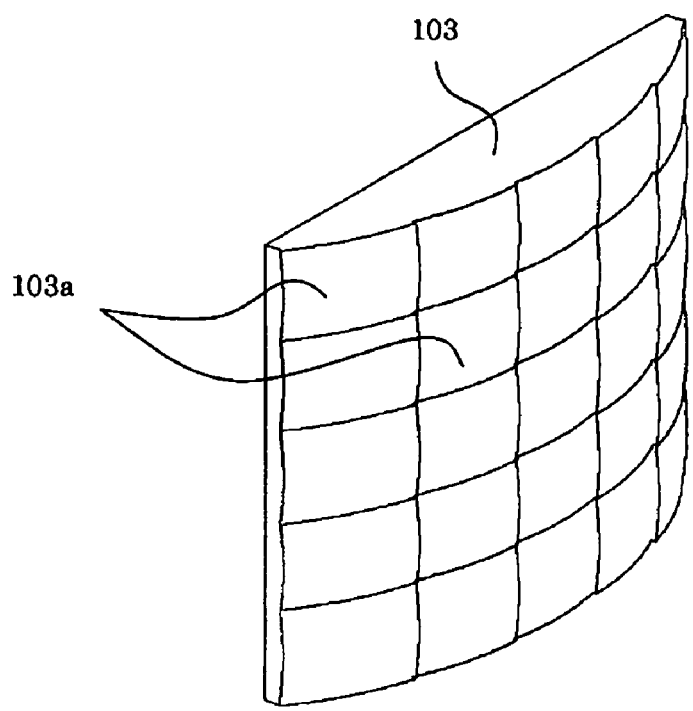
FIG. 3A is a perspective view of a first lens array in the first embodiment.
Figure 3B:
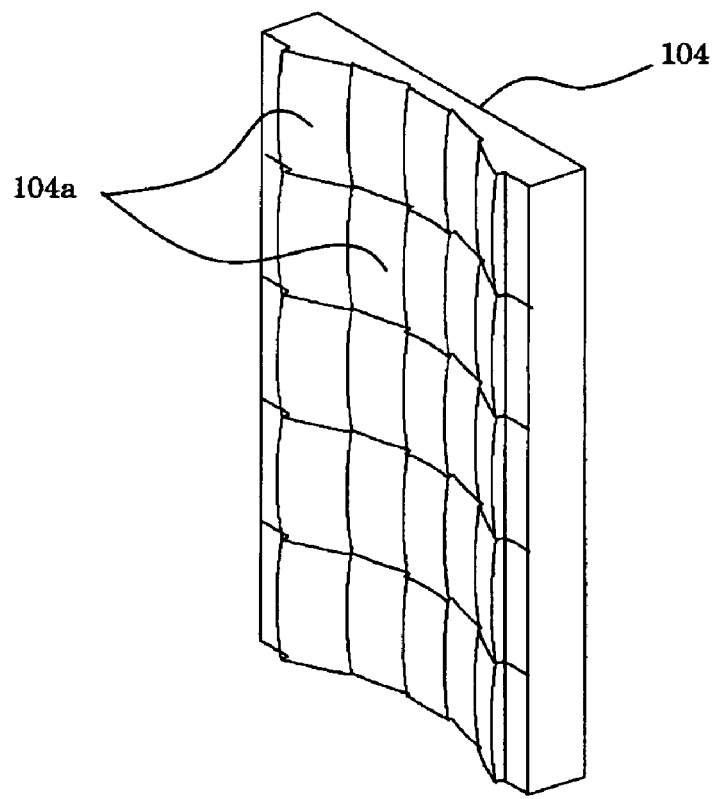
FIG. 3B is a perspective view of a second lens array in the first embodiment.

For molding convenience, decentering preferably reduces the number of steps at a boundary between the lens cells as small as possible. Any large step would block the light. It is therefore preferable to reduce the number of steps the by adjusting a height of the apex for each lens cell. FIGS. 3A and 3B show that the first and second lens arras 103 and 104 that almost eliminate the steps. As a result, as shown in FIG. 2, the following condition is met in the X direction with respect to a ratio W2/W1 between a width W1 of an effective lens cell array area of the first lens array 103 and a width W2 of an effective lens cell array area of the second lens array 104, which ratio is referred to as a light compression ratio:

$$W2/W1 < 0.7 \quad (2)$$

This ratio preferably satisfies:

$$W2/W1 < 0.6 \quad (2)'$$

The light compression ratio indicates a compression ratio of the light angular distribution on the XZ section, which is smaller than that on the YZ section. In other words, the light compression ratio in the X direction can be made larger than that in the Y direction. The light compression ratio on the YZ section is 1 in this embodiment.

Figure 5:
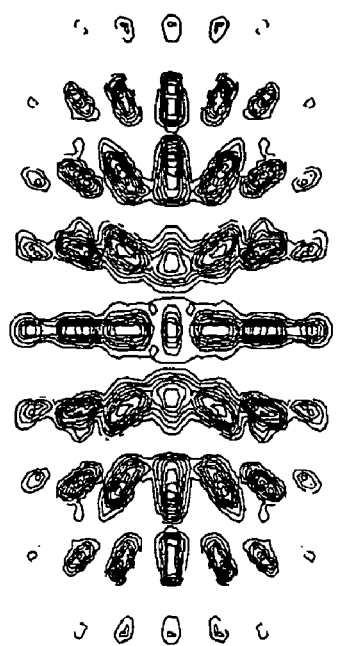
FIG. 5 is a view showing an example of a light source image in the first embodiment.

FIG. 5 shows an illustrative distribution of the light source image formed by an operation of the first lens array 103 of this embodiment, or an angular distribution of the light for illuminating the liquid crystal panel.

In FIGS. 1A and 1B, each split light that passes the polarization conversion element 105 is condensed by the condenser lens 106, transmits a polarization splitting plane 107a of the polarization beam splitter 107, and then uniformly illuminates the liquid crystal panel 108.

The light having a polarization direction changed and reflected on the liquid crystal panel 108 is incident again upon the polarization beam splitter 107, reflected on the polarization splitting plane 107a, introduced to the projection lens (not shown), and projected onto the screen (not shown). The polarization beam splitter 107 is arranged so that a plane that contains the central optical axis AXL or the Z-axis and the normal of the polarization splitting plane 107a accords with the XZ section.

The polarization beam splitter that includes a general dielectric multilayer coating on a polarization splitting plane has a very sensitive characteristic to the incident light angle on the (incident) plane that contains the incident light and the normal of the polarization splitting plane. In principle, since the polarization separation uses a reflectance difference between the p-polarized light (linearly polarized light oscillating on the incident plane) and the s-polarized light (linearly polarized light oscillating perpendicularly to the incident plane) at the Brewster angle, the polarization separation becomes insufficient as a difference between a light angle and the Brewster angle increases. Thus, when the incident light has a wide angular distribution on the XZ section, the polarization beam splitter reflects the polarized light that is to transmit or transmits the polarized light that is to be reflected, causing the (leakage) light at the polarization state different from the desired polarization state to enter the liquid crystal panel, and remarkably lowering image contrast.

On the other hand, the illumination optical system of this embodiment significantly compresses a light width on the XZ section, and narrows both a width of the light source image formed near the second lens array 104 and the light angular distribution on the XZ section, thereby reducing the leakage light, and providing a high-contrast projected image. In addition, the narrowed light width on the XZ section advantageously makes the polarization beam splitter small.

While this embodiment provides the lens cells of both the first and second lens arrays 103 and 104 with a toric lens, the lens cells of only one lens array may include the toric lens.

Second Embodiment

Figure 7:
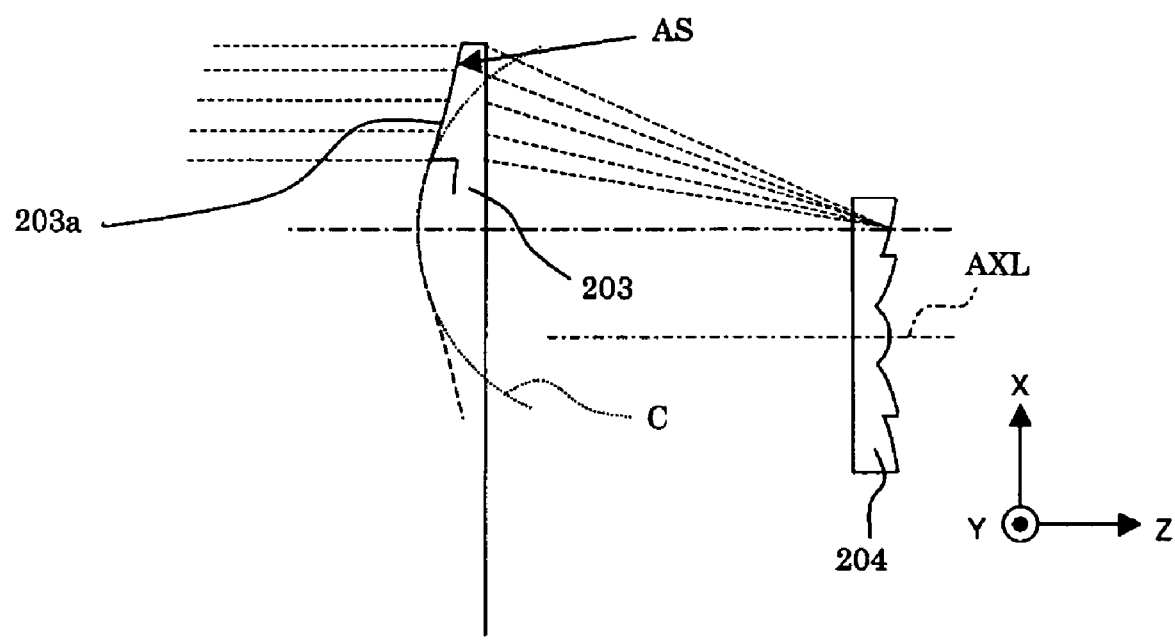
FIG. 7 is an enlarged view of the first and second lens arrays in the illumination optical system according to a second embodiment of the present invention.

FIG. 7 schematically shows the XZ section of the first lens cell 203a most distant from the central optical axis AXL in the first lens array 203 in the illumination optical system according to a second embodiment of the present invention. Although the entire illumination optical system is not shown, this embodiment has a basic structure similar to the illumination optical system of the first embodiment. This embodiment also satisfies Equation (2).

In this embodiment, a shape of the first lens cell 203a is an aspheric surface AS on the XZ section most distant from the central optical axis AXL. In FIG. 7, C denotes a spherical surface having the same apex as the aspheric surface AS, and a predetermined radius of curvature.

An aspheric surface AS of the first lens cell 203a on the XZ section may correct or mitigate the spherical aberration that would significantly occur when the first lens cell 203 uses a spherical surface C. A light source image that maintains its shape can be formed near the second lens array 204, while the significant light width compression is maintained on the XZ section. Similar to the first embodiment Therefore, this embodiment restrains the leakage light by narrowing the light angular distribution on the XZ section, and provides a high-contrast projected image.

In particular, this embodiment is effective to a configuration that has a small interval between the first and second lens arrays 203 and 204 and cannot remove the aberration by the spherical lens.

Although not shown in this embodiment, a first lens cell except for the first lens cell 203a most distant from the central optical axis AXL in the first lens array 203, and a second lens cell in the second lens array 204 may have a spherical or toric surface, or may have an aspheric surface on the XZ section.

Third Embodiment

Figure 8A:
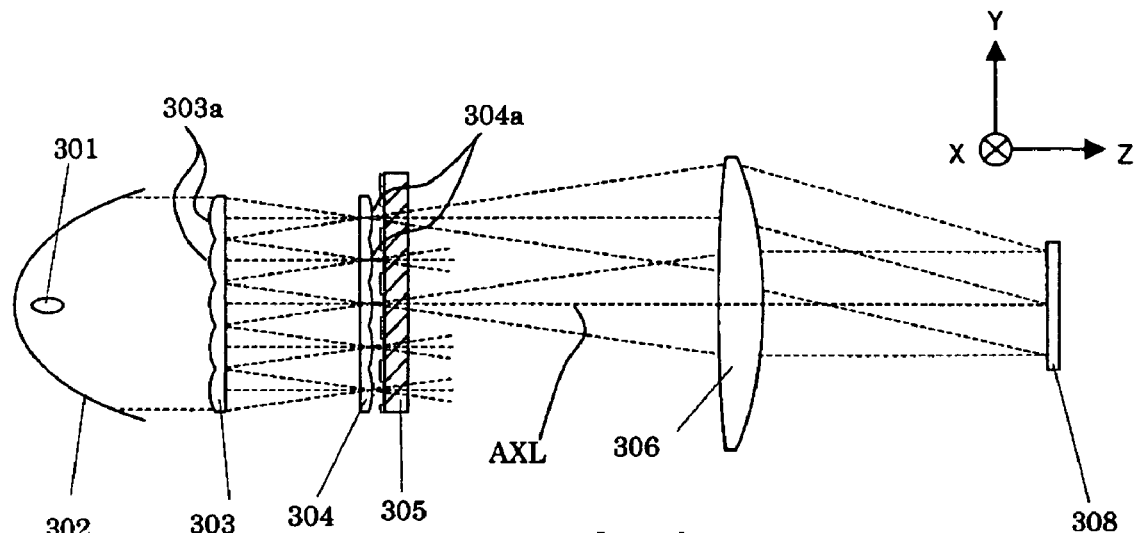
FIGS. 8A and 8B are sectional views showing a structure of an illumination optical system according to a third embodiment of the present invention.
Figure 8B:
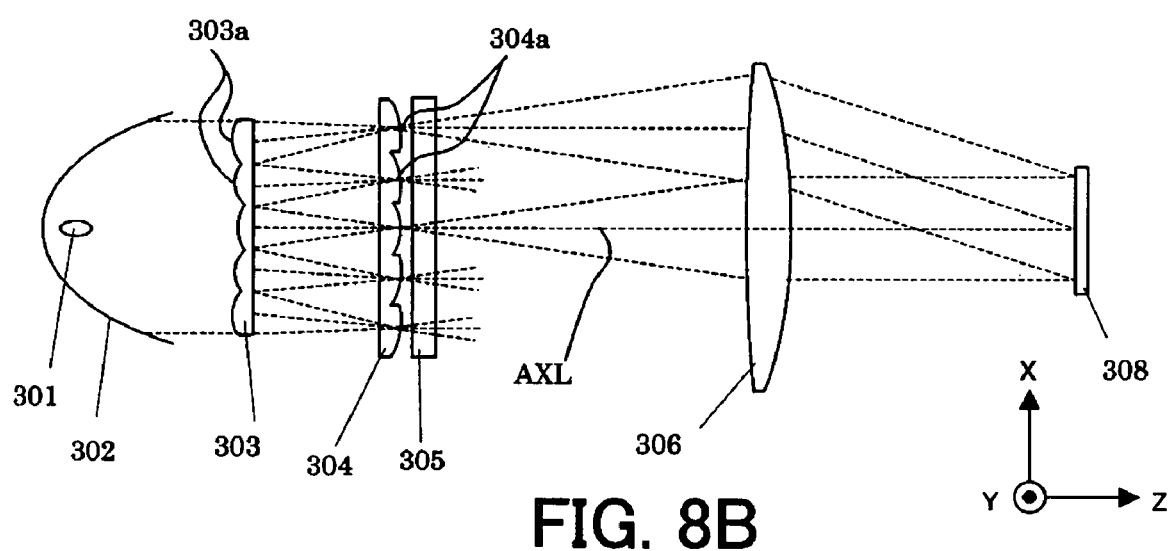

FIGS. 8A and 8B show an illumination optical system according to a third embodiment of the present invention. This embodiment also shows an illumination optical system in a projector that uses a reflection-type liquid crystal panel 308 as an image modulation element (or an image forming element). FIGS. 8A and 8B indicate the YZ and XZ sections, respectively.

The elements in the illumination optical system of this embodiment includes, similar to the first embodiment, a light source 301, a paraboloid reflector 302, a first lens array 303, a second lens array 304, a polarization conversion element 305, a condenser lens 306, and a polarization beam splitter (not shown) between the condenser lens 306 and the reflection-type liquid crystal panel 308.

This embodiment sets a light compression ratio W2/W1 greater than 1 on the XZ section, and an arrangement area width of the second lens cell 304a in the second lens array 304 wider than an arrangement area width of the first lens cell 303a in the first lens array 303. On the other hand, the light compression ratio is 1 on the YZ section.

Similar to the first embodiment, this embodiment decenters the lens cells 303a and 304a in the first and second lens arrays 303 and 304, and uses, for them, toric lenses having different radii of curvature between the XZ section and YZ section.

However, different from the first embodiment, the first lens cells 303a of the first lens array 303 decenter in the direction separating from the central optical axis AXL in the X direction, and the second lens cells 304a of the second lens array 304 decenter toward the central optical axis AXL in the X direction.

Thereby, the illumination efficiency improves although the angular distribution on the XZ section widens, since the second lens cells 304a have wider pitches relative to the plural light source images formed near the second lens array 304.

Fourth Embodiment

Figure 9A:
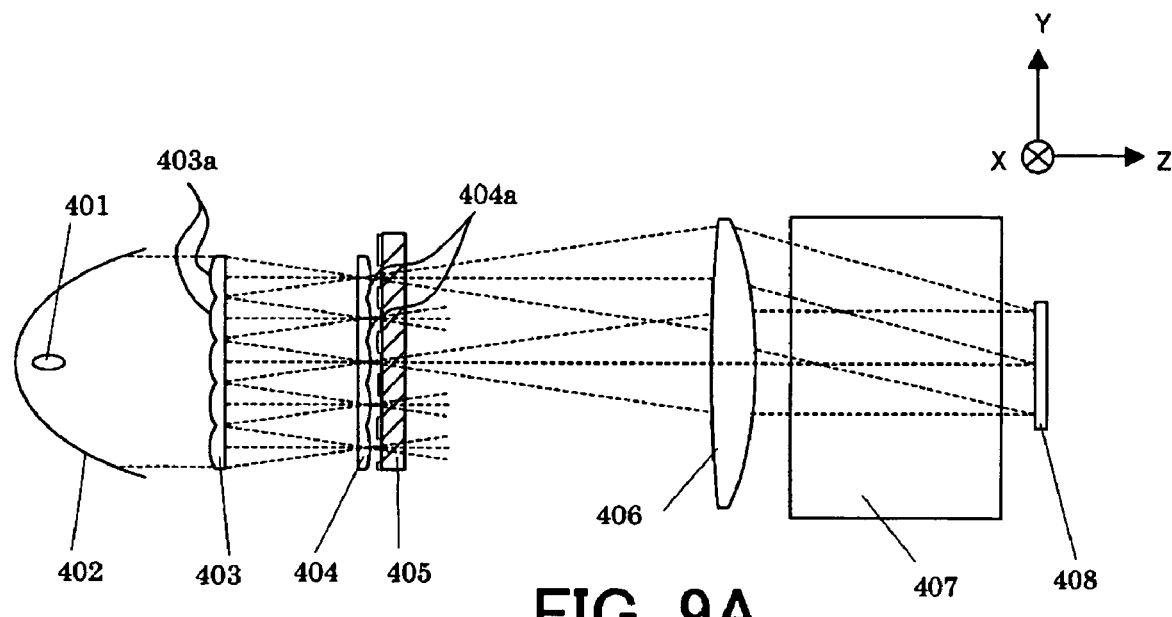
FIGS. 9A and 9B are sectional views showing a structure of an illumination optical system according to a fourth embodiment of the present invention.
Figure 9B:
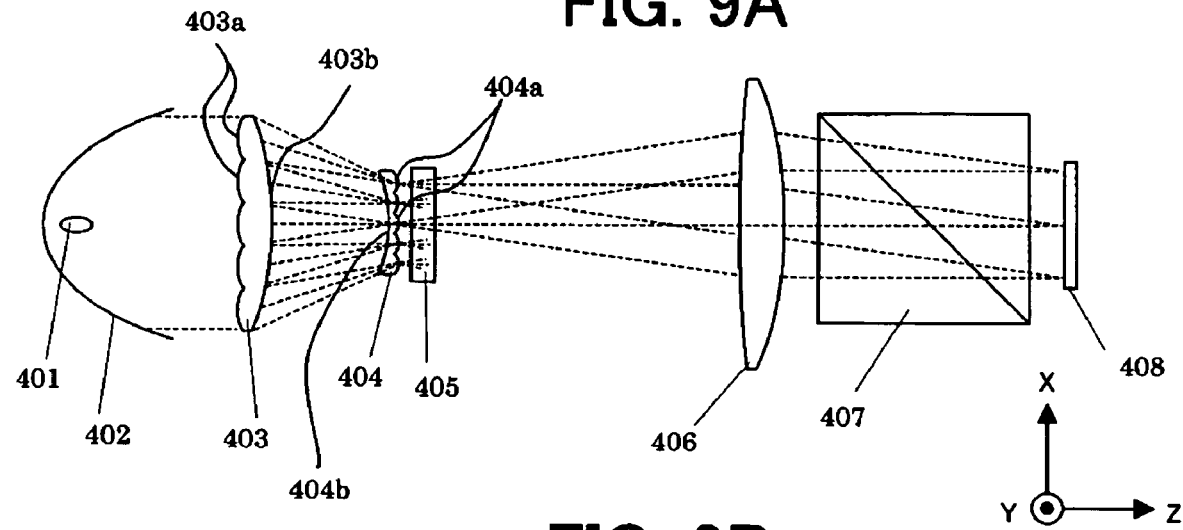

FIGS. 9A and 9B show a structure of an illumination optical system according to a fourth embodiment of the present invention. An illumination optical system in a projector of this embodiment also uses a reflection-type liquid crystal panel 408 as an image modulation element (or image forming element). FIGS. 9A and 9B show a wide light angular distribution (YZ section) and a narrow light angular distribution (XZ section). The light compression ratio is 1 on the YZ section.

The illumination optical system of this embodiment includes, as shown in the first embodiment, a light source 401, a paraboloid reflector 402, a first lens array 403, a second lens array 404, a polarization conversion element 405, a condenser lens 406, and a polarization beam splitter 407. This embodiment also satisfies Equation (2).

This embodiment makes each lens cell of each lens array of a spherical lens. So-called cylindrical lens surfaces 403b and 404b having a radius of curvature only on the XZ section are formed at the exit side of the first lens array 403 (opposite to the side at which the first lens cell 403a is formed) and at the incident side of the second lens array 404 (opposite to the side at which the second lens cells 404a is formed). The cylindrical lens surface 403b of the first lens array 403 has a convex lens surface, and the cylindrical lens surface 403b of the second lens array 403 has a concave lens surface. Thereby, an afocal optical system is formed and provides an effect to compress the collimated light on the XZ section. The aberration reducing effect is also provided. The cylindrical surface may be provided with another element. These effects can be enhanced when combined with decentering in the previous embodiment.

At least one of the cylindrical lens surface 403b of the first lens array 403 or the cylindrical lens surface 404b of the second lens array 404 may be made aspheric on the XZ section so as to reduce the spherical aberration similar to the second embodiment. These two cylindrical lens surfaces may have toric surfaces.

While this embodiment provides lens cells of both the first and second lens arrays 103 and 104 with a toric lens, the lens cells of only one lens array may include another lens surface, such as a cylindrical lens surface, a toric lens surface, and an aspheric lens surface.

Fifth Embodiment

Figure 10:
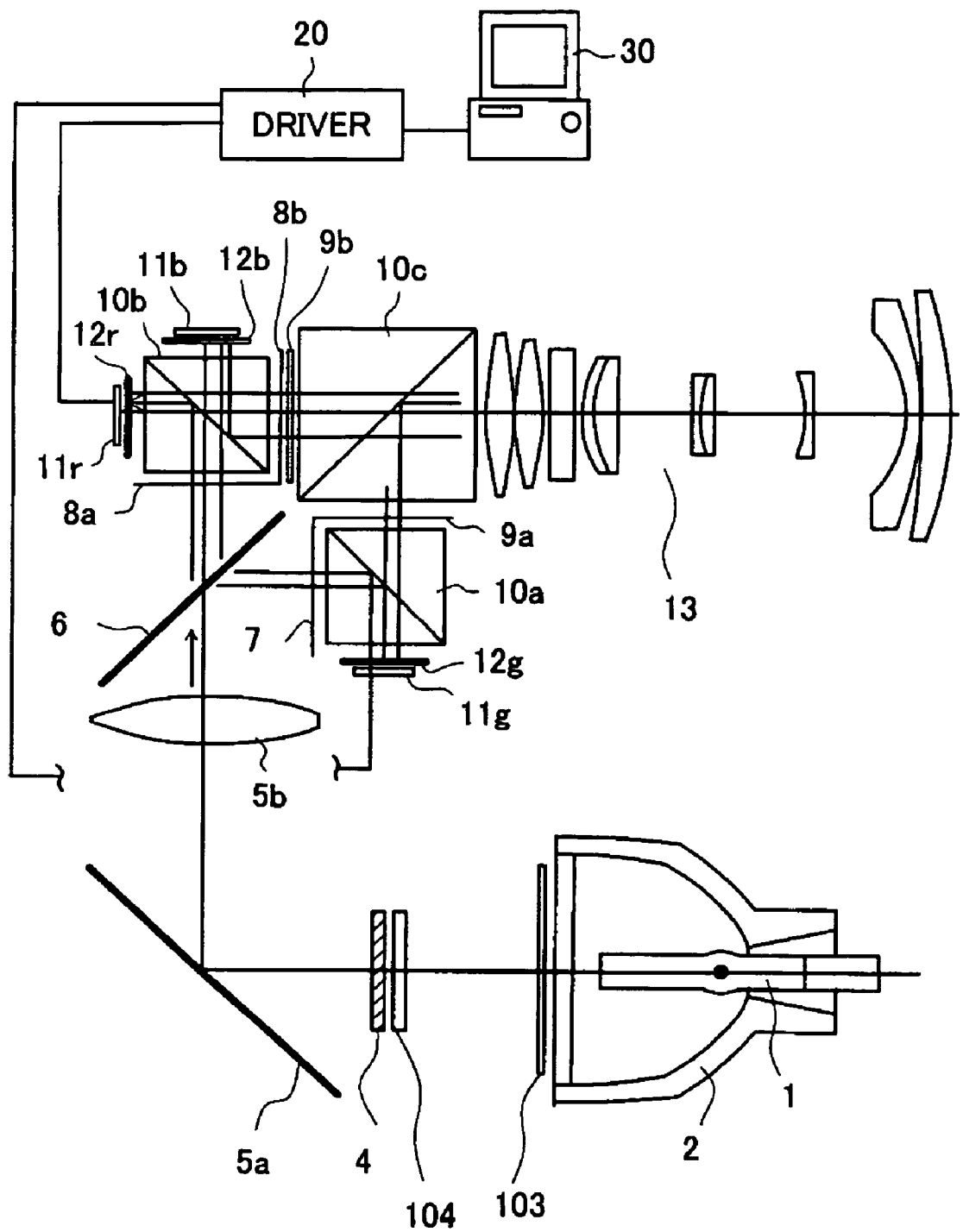
FIG. 10 is a sectional view showing a structure of an entire optical system in a projector according to a fifth embodiment of the present invention.
Figure 11A:
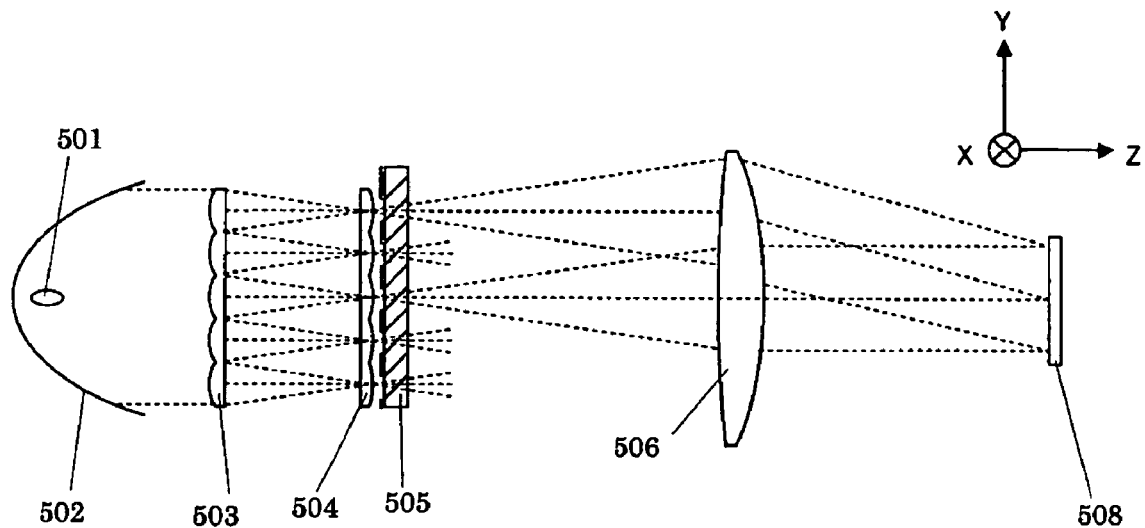
FIGS. 11A and 11B are sectional views showing a structure of a conventional illumination optical system.
Figure 11B:
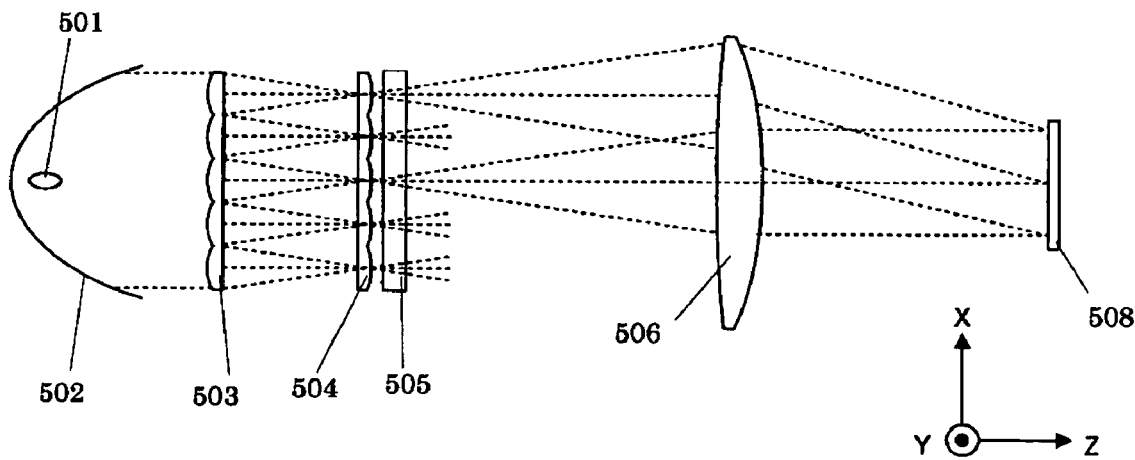
Figure 12:
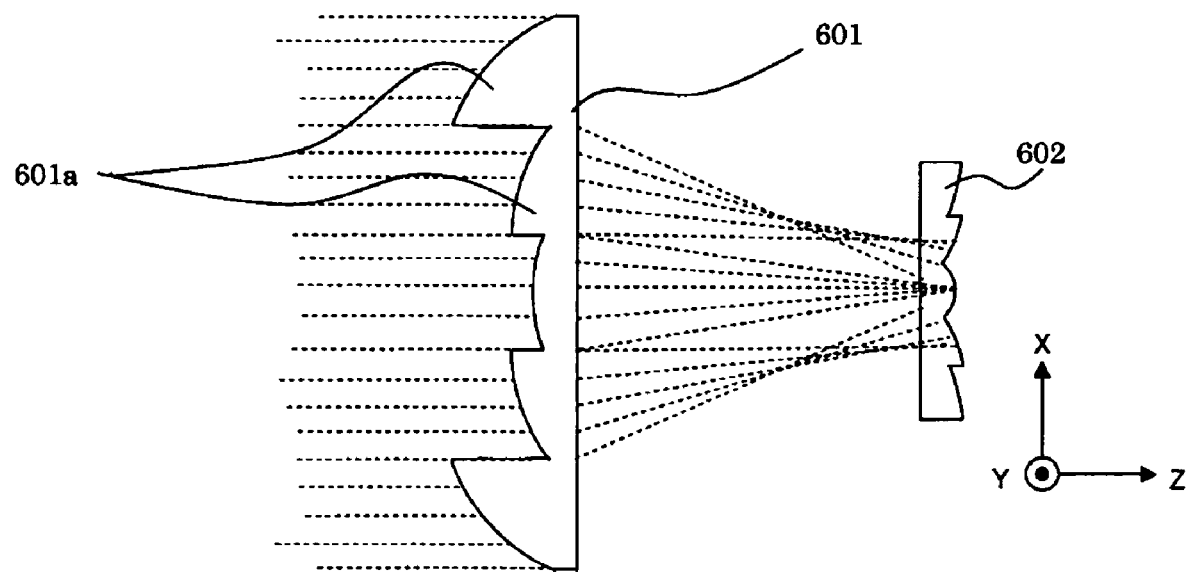
FIG. 12 is an enlarged view of the first and second lens arrays in the conventional illumination apparatus.

FIG. 10 shows a structural example of an overall optical system of a projection optical unit that includes an illumination optical system described in the first embodiment. FIG. 10 assigns new numerals to components other than first and second lens arrays 103 and 104. The first and second lens arrays 103 and 104 in this embodiment may be replaced with the first and second lens arrays described in the second to fourth embodiments.

1 denotes a light source that emits a white light at a continuous spectrum. 103, 104 are first and second lens arrays describe in the first embodiment.

4 denotes a polarization conversion element that converts a non-polarized light to the predetermined polarized light. 5a denotes a mirror, and 5b denotes a condenser lens.

6 denotes a dichroic mirror that transmits the lights in blue (B) and red (R) wave ranges, and reflects the light in a green (G) wave range. 7 denotes a color filter that partially cuts the light of an intermediate wave range of the G and R lights. 8a and 8b are first and second color-selecting phase-difference plates (color-selecting retarder) each of which convert the polarization direction of the B light by 90°, and does not convert the polarization direction of the R light.

9a and 9b are first and second ½ wave plates. 10a, 10b and 10c are first to third polarization beam splitters that transmit the p-polarized light and reflect the s-polarized light.

11r, 11g and 11b are R reflection-type liquid crystal panel, G reflection-type liquid crystal panel, and B reflection-type liquid crystal panel, which form an original image, reflect the incident light, and modulate an image. These liquid crystal panels 11r, 11g and 11b are connected to a driver 20. An image information supplier 30, such as a personal computer ("PC"), a camera, a DVD player, a VCR, and a broadcasting receiver, supplies image information to the driver 20. The driver 20 drives the liquid crystal panels 11r, 11g, and 11b based on input image information, and forms an original image for each color corresponding to image information.

12r, 12g, and 12b are R-use ¼ wave plate, G-use ¼ wave plate, and B-use ¼ wave plate. An optical system in an optical path from the dichroic mirror 6 to the third polarization beam splitter 10c serves as a color separating/synthesizing optical system for a color separation and a color synthesis. 13 denotes a projection lens.

A description will now be given of an optical operation. A light emitted from the light source 1 is condensed by the reflector 2 in a predetermined direction. The reflector 2 has a paraboloid shape, and the light from a focal point of the paraboloid surface becomes parallel to the symmetrical axis of the paraboloid surface. The collimated light is split into plural lights by the first lens array 103, is condensed, forms plural light source images near the second lens array 104, and reaches the polarization conversion element 4.

The polarization conversion element 4 includes, in order from the incident side, a polarization splitting surface, a reflecting surface, and a ½ wave plate. The condensed light for each row is incident upon the polarization splitting surface of the polarization conversion element 4 corresponding to the row, and split into a p-polarized light component that transmits the polarization splitting surface and an s-polarized light component that is reflected on the polarization splitting surface. The incident s-polarized light component is reflected on the reflecting surface, and exits in the same direction as the p-polarized light component. On the other hand, a transmitting p-polarized light component is converted into the same polarization component as the s-polarized light component when transmitting the ½ wave plate, and exits as the light having the aligned polarization direction (where • denotes the s-polarized light in the drawing). The plural polarization-converted lights are condensed near the polarization conversion element, and then reach, as divergent lights, the condenser lens 5b via the mirror 5a.

Due to the condensing operation of the condenser lens 5b, plural lights overlap at an imaging position of a shape of each lens cell in the first and second lens arrays 103 and 104, forming a uniform rectangular illumination area. The light exiting from the condenser lens 5b is incident upon the dichroic mirror 6. The dichroic mirror 6 transmits the B and R lights, and reflects the G light.

In FIG. 10, the s-polarized light emitted from the polarization conversion element 4 is an s-polarized light (•) relative to the dichroic mirror 6.

In the optical path of the G light, the light reflected on the dichroic mirror 6 enters the color filter 7. The color filter 7 is a dichroic filter that reflects a yellow color corresponding to an intermediate wavelength between G and R, thereby removing the yellow light. Green when containing more yellow component turns into greenish-yellow, and the color filter 7 preferably filters the yellow component for color reproductions. The color filter 7 may have a characteristic that absorbs the yellow color.

The thus color-adjusted G light is incident as the s-polarized light (•) upon the first polarization beam splitter 10a, is reflected on the polarization splitting surface, and reaches the G-use reflecting liquid crystal panel 11g. The G-use reflecting liquid crystal panel 11g modulates the image light and reflects the G light. The s-polarized light component (•) in the modulated and reflected G light is reflected on the polarization splitting surface of the first beam splitter 10a, and returned to the light source side and removed from the projected light.

On the other hand, the p-polarized light (which is shown as (|) in FIG. 10) in the modulated and reflected G light transmits the polarization splitting surface of the first polarization beam splitter 10a and becomes the projected light. In the state of indicating black where all the polarized light components are converted into the s-polarized light, a slow axis is adjusted to the predetermined direction, thereby maintaining small the disturbance of the polarization state generated in the first polarization beam splitter 10a and G-use reflection-type liquid crystal panel 11g. The slow axis is one of the birefringence principal axes of the ¼ wave plate 12g provided between the first polarization beam splitter 10a and G-use reflection-type liquid crystal panel 11g.

The first ½ wave plate 9a rotates by 90° a polarization direction of the G light (|) as a p-polarized light that transmits the first polarization beam splitter 10a. The G light then enters, as an s-polarized light (•), the third polarization beam splitter 10c.

The first color-selecting phase-difference plate 8*a* receives the R and B lights that transmit the dichroic mirror 6. The first color-selecting phase-difference plate 8*a* serves to rotate the polarization direction of the B light by 90°. Thereby, the B light is incident as the p-polarized light (|), and the R light is incident as the s-polarized light (•), upon the second polarization beam splitter 10*b*. The B light transmits the polarization splitting surface of the second polarization beam splitter 10*b*, and is incident upon the B-use reflection-type liquid crystal panel 11*b* via the ¼ phase plate 12*b*. The R light is reflected on the polarization splitting surface, and incident upon the R-use reflection-type liquid crystal panel 11*r* via the ¼ wave plate 12*r*.

The B-use reflection-type liquid crystal panel 11*b* modulates and reflects the B light. The p-polarized light component (|) in the modulated B light again transmits the polarization splitting surface, is returned to the light source side, and is removed from the projected light.

Similarly, the R-use reflection-type liquid crystal panel 11*r* modulates and reflects the R light. The s-polarized light component (•) in the modulated R light is again reflected on the polarization splitting surface, returned to the light source side, and removed from the projected light. The p-polarized light component (|) in the modulated R light transmits the polarization splitting surface, and becomes the projected light. Thereby, the projected B and R lights are synthesized into one light.

The composite B and R projected light enters the second color-selecting phase-difference plate 8*b*. The second color-selecting phase-difference plate 8*b* is the same as the first color-selecting phase-difference plate 8*a*, and rotates the polarization direction of only the B light by 90°. Thereby, both the R and B lights are incident, as a p-polarized light (|), upon the third polarization beam splitter 10*c*, transmits the polarization splitting surface, is synthesized with the G projected light, and reaches the projection lens 13. The projection lens 13 projects the light onto a projection surface, such as a screen.

As described above, each embodiment reduces an aberration using a lens surface different from the toric surface, aspheric surface or lens cell, maintains a sufficiently small light angular distribution and high light use efficiency, and provides an optical system in which a lens array can be molded easily.

When this optical system is used for a projection optical unit in an image projection apparatus, a bright projection image with high image quality can be obtained.

Furthermore, the present invention is not limited to these preferred embodiments and various variations and modifications may be made without departing from the scope of the present invention.

This application claims a foreign priority benefit based on Japanese Patent Application No. 2005-182786, filed on Jun. 23, 2005, which is hereby incorporated by reference herein in its entirety as if fully set forth herein.

What is claimed is:

1. A lens array optical system comprising:
   a first lens array that includes a plurality of first lens cells arranged in first and second directions, the first lens array being configured to split a light flux to a plurality of split light fluxes and to condense each split flux; and
   a second lens array that includes a plurality of second lens cells arranged in the first and second directions, each second lens cell being configured to receive the split lights from each first lens cell,
   wherein a value made by dividing a width of an arrangement area of the second lens cells by a width of an arrangement area of the first lens cells in the first direction is smaller than a value made by dividing a width of an arrangement area of the second lens cells by a width of an arrangement area of the first lens cells in the second direction,
   wherein at least one of the first and second lens arrays has a toric surface, and
   wherein a radius of curvature of the toric surface on a first section parallel to the first direction and the central optical axis direction is greater than that on a second section parallel to the central optical axis direction and the second direction.

2. The lens array optical system according to claim 1, wherein at least one of the first and second lens arrays include a plurality of lens cells each having a toric surface, in which a lens cell that is more distant from the central optical axis of the optical system has a larger radius of curvature of the toric surface on the first section.

3. A lens array optical system comprising:
   a first lens array that includes a plurality of first lens cells arranged in first and second directions, the first lens array being configured to split a light flux to a plurality of split light fluxes and to condense each split flux; and
   a second lens array that includes a plurality of second lens cells arranged in the first and second directions, each second lens cell being configured to receive the split lights from each first lens cell,
   wherein a ratio between a width of an arrangement area of the first lens cells and a width of an arrangement area of the second lens cells in the first direction is different from a ratio between a width of an arrangement area of the first lens cells and a width of an arrangement area of the second lens cells in the second direction,
   wherein at least one of the first and second lens arrays has a toric surface, and
   wherein $W2/W1<0.7$ is met, where W1 is the width of the arrangement area of the first lens cells, and W2 is the width of the arrangement area of the second lens cells in the first direction.

4. A projection optical unit comprising:
   an illumination optical system for illuminating an image forming element using a light flux from a light source; and
   a projection optical system for projection the light from the image forming element,
   wherein said illumination optical system includes a lens array optical system that includes:
   a first lens array that includes a plurality of first lens cells arranged in first and second directions, the first lens array being configured to split a light flux to a plurality of split light fluxes and to condense each split flux; and
   a second lens array that includes a plurality of second lens cells arranged in the first and second directions, each second lens cell being configured to receive the split lights from each first lens cell,
   wherein a value made by dividing a width of an arrangement area of the second lens cells by a width of an arrangement area of the first lens cells in the first direction is smaller than a value made by dividing a width of an arrangement area of the second lens cells by a width of an arrangement area of the first lens cells in the second direction, wherein at least one of the first and second lens arrays has a toric surface, and
   wherein a radius of curvature of the toric surface on a first section parallel to the first direction and the central optical axis direction is greater than that on a second section parallel to the central optical axis direction and the second direction.

5. An image projection apparatus comprising:
an image forming element;
an illumination optical system for illuminating the image forming element using a light flux from a light source; and
a projection optical system for projecting the light from the image forming elements,
wherein said illumination optical system includes a lens array optical system that includes:
  a first lens array that includes a plurality of first lens cells arranged in first and second directions, the first lens array being configured to split a light flux to a plurality of split light fluxes and to condense each split flux; and
  a second lens array that includes a plurality of second lens cells arranged in the first and second directions, each second lens cell being configured to receive the split lights from each first lens cell,
  wherein a value made by dividing a width of an arrangement area of the second lens cells by a width of an arrangement area of the first lens cells in the first direction is smaller than a value made by dividing a width of an arrangement area of the second lens cells by a width of an arrangement area of the first lens cells in the second
  wherein at least one of the first and second lens arrays has a toric surface, and
  wherein a radius of curvature of the toric surface on a first section parallel to the first direction and the central optical axis direction is greater than that on a second section parallel to the central optical axis direction and the second direction.

6. An image projection apparatus comprising:
an image forming element;
an illumination optical system for illuminating the image forming element using a light flux from a light source; and
a projection optical system for projection the light from the image forming element, wherein said illumination optical system includes a lens array optical system that includes:
  a first lens array that includes a plurality of first lens cells arranged in first and second directions, the first lens array being configured to split a light flux to a plurality of split light fluxes and to condense each split flux; and
  a second lens array that includes a plurality of second lens cells arranged in the first and second directions, each second lens cell being configured to receive the split lights from each first lens cell,
  wherein a ratio between a width of an arrangement area of the first lens cells and a width of an arrangement area of the second lens cells in the first direction is different from a ratio between a width of an arrangement area of the first lens cells and a width of an arrangement area of the second lens cells in the second direction,
  wherein at least one of the first and second lens arrays has a toric surface, and
  wherein $W2/W1<0.7$ is met, where $W1$ is the width of the arrangement area of the first lens cells, and $W2$ is the width of the arrangement area of the second lens cells in the first direction.

* * * * *